United States Patent
Wu

(10) Patent No.: US 9,863,596 B2
(45) Date of Patent: Jan. 9, 2018

(54) OPTICAL ELEMENT, OPTICAL MODULE, AND LENS CARRIER

(71) Applicant: Chun-Te Wu, Taipei (TW)

(72) Inventor: Chun-Te Wu, Taipei (TW)

( * ) Notice: Subject to any disclaimer, the term of this patent is extended or adjusted under 35 U.S.C. 154(b) by 8 days.

(21) Appl. No.: 15/011,426

(22) Filed: Jan. 29, 2016

(65) Prior Publication Data

US 2017/0219177 A1    Aug. 3, 2017

(51) Int. Cl.
*F21V 5/00* (2015.01)
*F21S 8/10* (2006.01)
*F21K 9/69* (2016.01)
*G02B 3/08* (2006.01)
*G02B 3/02* (2006.01)

(52) U.S. Cl.
CPC ............ *F21S 48/1225* (2013.01); *F21K 9/69* (2016.08); *F21S 48/1104* (2013.01); *F21S 48/115* (2013.01); *G02B 3/08* (2013.01); *G02B 3/02* (2013.01)

(58) Field of Classification Search
CPC ...... F21S 48/12; F21S 48/1216; F21S 48/125; F21S 48/1258; F21S 48/1275; F21S 48/1291; G02B 3/0081; G02B 3/02; G02B 3/06; G02B 3/08; G02B 3/10; G02B 2003/0093
See application file for complete search history.

(56) References Cited

U.S. PATENT DOCUMENTS

| 5,499,166 | A | * | 3/1996 | Kato | B60Q 1/0011 362/511 |
| 6,416,210 | B1 | * | 7/2002 | Uchida | F21S 48/1258 362/338 |
| 7,357,545 | B2 | * | 4/2008 | Stefka | F21S 48/10 362/332 |
| 7,700,906 | B2 | * | 4/2010 | Stam | G02B 27/1013 250/208.1 |
| 2007/0236950 | A1 | * | 10/2007 | Stefanov | F21S 48/1154 362/496 |
| 2009/0213608 | A1 | * | 8/2009 | Mozaffari-Afshar | F21S 48/1258 362/520 |
| 2011/0096561 | A1 | * | 4/2011 | Owada | F21S 48/1154 362/521 |
| 2012/0188781 | A1 | * | 7/2012 | Futami | F21S 48/1154 362/516 |

(Continued)

FOREIGN PATENT DOCUMENTS

| CN | 2477944 | 2/2002 |
| CN | 104344306 | 2/2015 |
| TW | M405383 | 6/2011 |

*Primary Examiner* — Alexander Garlen
(74) *Attorney, Agent, or Firm* — JCIPRNET

(57) ABSTRACT

An optical element including a light entering surface and a light exiting surface is provided. The light exiting surface is opposite to the light entering surface, and includes a first portion, a second portion, and a third portion. The first portion is a curved surface. The second portion is a curved surface and spaced from the first portion by a step difference. The third portion extends from the first portion to the second portion along a first extending direction, wherein the first portion extends along a second extending direction, and the first extending direction is inclined with respect to the second extending direction. An optical module and a lens carrier are also provided.

13 Claims, 6 Drawing Sheets

(56) References Cited

U.S. PATENT DOCUMENTS

2012/0235027 A1\* 9/2012 Sangu ................ G01J 5/0025
 250/214.1
2014/0085919 A1 3/2014 Tsai et al.
2015/0043239 A1 2/2015 Han \* cited by examiner

OPTICAL ELEMENT, OPTICAL MODULE, AND LENS CARRIER

BACKGROUND OF THE INVENTION

1. Field of the Invention

The invention relates to an optical element, an optical module, and a lens carrier.

2. Description of Related Art

With the improvement of light source technology, new generation light sources, e.g. light-emitting diodes (LEDs), have been adopted in automobile headlights. LED headlights have been gradually applied in compliance with requirements for light-emitting efficiency, energy saving, and environmental protection. Especially, more and more high-end automobiles adopt LED headlights.

However, the optical property of LEDs is different from that of conventional halogen bulbs or xenon lamps. Light emitted by LED chips usually has high directivity. When an LED is combined with the optical elements of a conventional headlight module, the volume of the headlight module is large, and the optical alignment between the LED and the optical elements is complicated. Moreover, the reflective material of a conventional optical element may absorb some light, and a shielding element configured to form a cut-off line may block some light, so that the light efficiency of the headlight module is reduced.

In addition, the precision of the alignment of a halogen bulb or a xenon lamp in a conventional headlight module is not needed to be high. As a result, if an LED is used to replace the halogen bulb or the xenon lamp in the conventional headlight module to form a new leadlight module, the light efficiency of the new leadlight module is not satisfied.

SUMMARY OF THE INVENTION

Accordingly, the invention is directed to an optical element, which has high light use efficiency.

The invention is directed to an optical module, which has high light efficiency.

The invention is directed to a lens carrier, which can increase light efficiency.

According to an embodiment of the invention, an optical element including a light entering surface and a light exiting surface is provided. The light exiting surface is opposite to the light entering surface, and includes a first portion, a second portion, and a third portion. The first portion is a curved surface. The second portion is a curved surface and spaced from the first portion by a step difference. The third portion extends from the first portion to the second portion along a first extending direction, wherein the first portion extends along a second extending direction, and the first extending direction is inclined with respect to the second extending direction.

According to an embodiment of the invention, an optical module including a light source unit, a lens, and the aforementioned optical element is provided. The light source unit is configured to emit light. The lens is disposed on a path of the light. The optical element is disposed on the path of the light, and the lens is disposed between the light source unit and the optical element.

According to an embodiment of the invention, a lens carrier configured to fix a light source unit and a lens is provided. The lens carrier includes a first bottom base surface, a second bottom base surface, a plurality of bottom positioning structures, a plurality of top positioning structures, and a top base surface. The first bottom base surface is on a bottom side of the lens carrier and at a first fixed relative position with respect to a bottom surface of the light source unit. The second bottom base surface is on the bottom side and at a second fixed relative position with respect to a light emitting surface of the light source unit. The bottom positioning structures are located on the bottom side and respectively engaged with a plurality of positioning structures of the light source unit. The top positioning structures are located on a top side of the lens carrier opposite to the bottom side and respectively engaged with a plurality of positioning structures of the lens. The top base surface is on the top side and at a third fixed relative position with respect to the lens.

In the optical element and the optical module according to the embodiment of the invention, the third portion of the light exiting surface extends from the first portion to the second portion along a first extending direction, and the first extending direction is inclined with respect to the second extending direction of the first portion, so that a cut-off line may be formed 25 meters away from the optical module or the optical element and may comply with related regulations, e.g. ECE R112 code in Regulations of United Nations Economic Commission for Europe (ECE regulations). That is to say, the related regulations may be satisfied by using the optical element having the light entering surface and the light exiting surface, so that the light use efficiency of the optical element and the light efficiency of the optical module are improved. In the lens carrier according to the embodiment of the invention, the first bottom base surface, the second bottom base surface, and the bottom positioning structures are configured to position the light source unit, and the top base surface and the top positioning structures are configured to position the lens, so that the lens may be precisely positioned at a relative position with respect to the light source unit, so as to ensure the lens effectively using the light from the light source unit to form a light shape complying with the related regulations and thus increase light efficiency.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
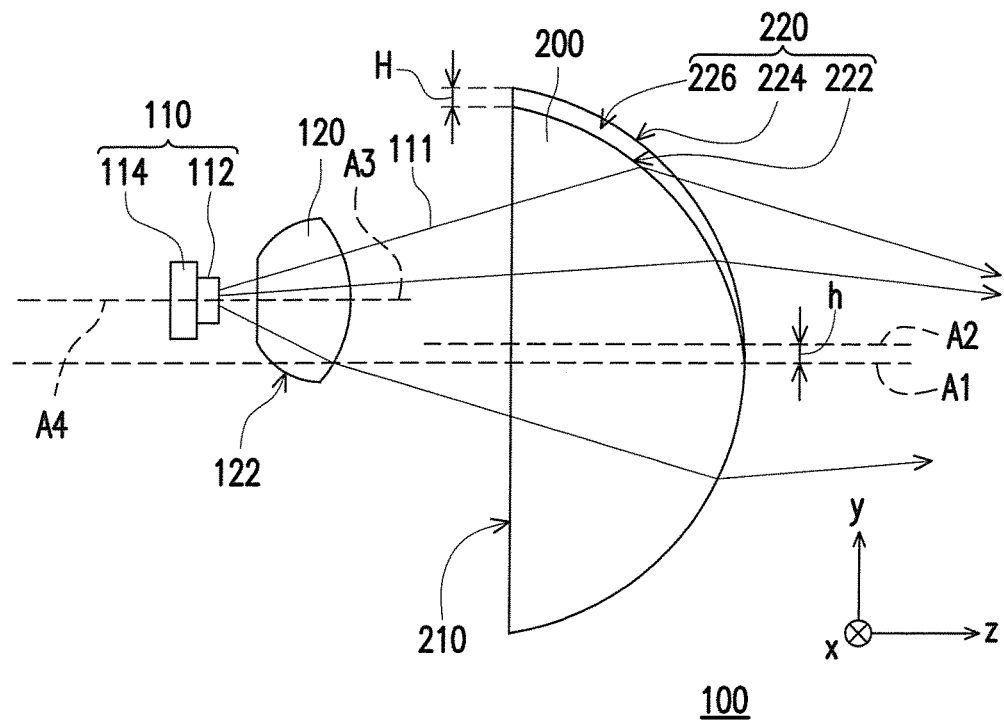
FIG. 1 is a schematic view showing a light path of an optical module according to an embodiment of the invention.
Figure 2A:
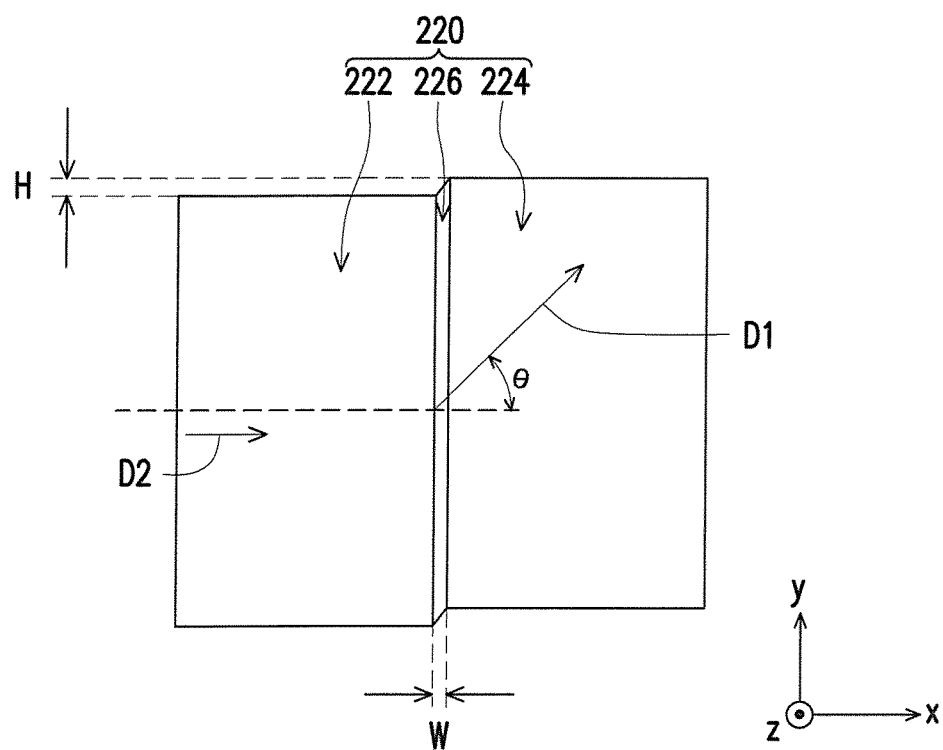
FIG. 2A is a schematic front view of the optical element in FIG. 1.
Figure 2B:
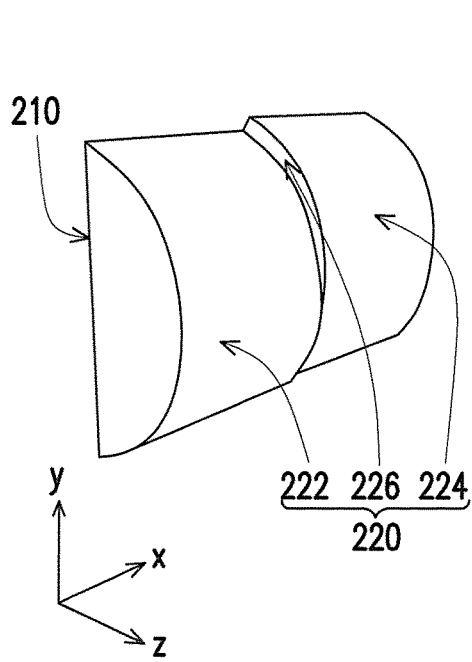
FIGS. 2B and 2C are schematic perspective views of the optical element in FIG. 1.
Figure 2C:
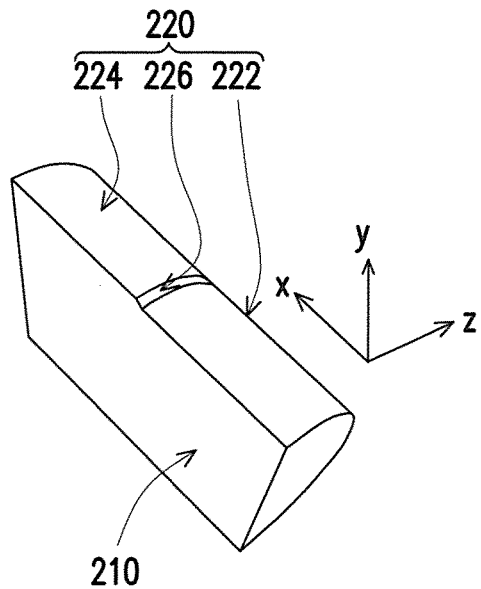

Reference will now be made in detail to the present embodiments of the invention, examples of which are illus- FIG. 1 is a schematic view showing a light path of an optical module according to an embodiment of the invention, FIG. 2A is a schematic front view of the optical element in FIG. 1, and FIGS. 2B and 2C are schematic perspective views of the optical element in FIG. 1. Referring to FIGS. 1 and 2A-2C, the optical module 100 in this embodiment includes a light source unit 110, a lens 120, and an optical element 200. The light source unit 110 is configured to emit light 111. In this embodiment, the light source unit 110 includes a carrying board 114 and an LED 112 disposed on the carrying board 114. The carrying board 114 may be a submount carrying the LED 112 or a circuit board carrying the LED 112. In other embodiments, the source unit 110 may include a plurality of LEDs 112 disposed on the carrying board 114.

The lens 120 is disposed on a path of the light 111. In this embodiment, the lens 120 is a plane-convex lens having a curved side wall 122, but the invention is not limited thereto. In other embodiment, the lens 120 may be a biconvex lens, a concave-convex lens, or any other appropriate lens.

The optical element 200 is disposed on the path of the light 111, and the lens 120 is disposed between the light source unit 110 and the optical element 200. The space occupied by the light source unit 110, the lens 120 and the optical element 200 may be defined by a Cartesian coordinate system having an x-direction, a y-direction, and a z-direction perpendicular to each other, as shown in FIGS. 1 and 2A-2C. The optical element 200 includes a light entering surface 210 and a light exiting surface 220. The light exiting surface 220 is opposite to the light entering surface 210, and includes a first portion 222, a second portion 224, and a third portion 226. In this embodiment, the optical element 200 is a lens, and the light entering surface 210 and the light exiting surface 220 refract the light 111 in sequence. The first portion 222 is a curved surface, e.g. a convex surface. The second portion 224 is a curved surface, e.g. a convex surface, and spaced from the first portion 222 by a step difference H, wherein the step difference H is, for example, along the y-direction. The third portion 226 extends from the first portion 222 to the second portion 224 along a first extending direction D1, wherein the first portion 222 extends along a second extending direction D2, the first extending direction D1 is inclined with respect to the second extending direction D2, and the second extending direction D2 is, for example, the x-direction. In this embodiment, the first extending direction D1 is substantially parallel to the xy plane. In other words, in this embodiment, each point at the right edge of the first portion 222 and a corresponding point at the left edge of the second portion 224 as shown in FIG. 2A are connected by a inclined line segment extending along the first extending direction D1, and all the inclined line segments respectively connecting all the points at the right edge of the first portion 222 with the corresponding points at the left edge of the second portion 224 as shown in FIG. 2A form the third portion 226. In this embodiment, the second portion 224 also extends along the second extending direction D2, but the invention is not limited thereto.

The first portion 222, the second portion 224, and the third portion 226 may be pillar-shaped surfaces, cylindrical surfaces, or freeform surfaces. In this embodiment, the first portion 222 and the third portion 226 are cylindrical surfaces, for example. In this embodiment, a radius of curvature of the first portion 222 is substantially the same as a radius of curvature of the second portion 224, but the invention is not limited thereto.

In this embodiment, a cross-section of the optical element 200 perpendicular to the second extending direction D2 and formed by cutting the first portion 222 has a first axis of symmetry A1, wherein the cross-section is parallel to the yz plane. A cross-section of the optical element 200 perpendicular to the second extending direction D2 and formed by cutting the second portion 224 has a second axis of symmetry A2, wherein the cross-section is parallel to the yz plane. The distance h between the first axis of symmetry A1 and the second axis of symmetry A2 and along a direction perpendicular to the second extending direction D2 is substantially the same as the step difference H, wherein the distance h is along the y-direction in this embodiment. In this embodiment, the first axis of symmetry A1 is substantially parallel to the second axis of symmetry A2, but the invention is not limited thereto.

In this embodiment, the second portion 224 is spaced from the first portion 222 by a width W along the second extending direction D2 (i.e. along the x-direction), and the width W is substantially the same as the step difference H. That is, the included angle θ between the first extending direction D1 and the second extending direction D2 is, for example, 45 degrees. However, the invention is not limited thereto. Moreover, in this embodiment, the light entering surface 210 is a plane. However, in other embodiments, the light entering surface 210 may be a curved surface, e.g. a convex surface or a concave surface.

Figure 3:
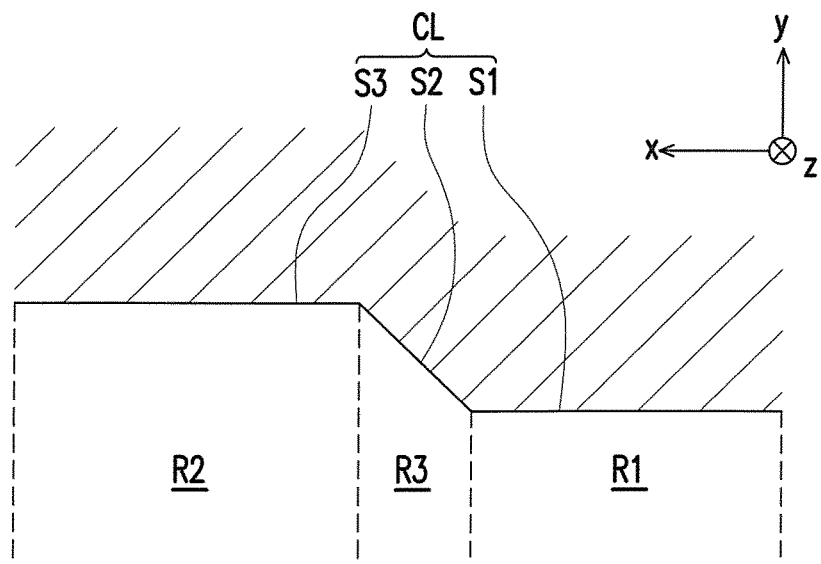
FIG. 3 is a schematic diagram showing the light distribution on the plane 25 meters away from the optical module in FIG. 1.

In this embodiment, the optical axis A3 of the lens 120 coincides with the optical axis A4 of the light source unit 110, wherein the optical axis A3 and the optical axis A4 are, for example, substantially parallel to the z direction. Moreover, the optical axis A3 of the lens 120 and the first axis of symmetry A1 are not at the same height along a direction perpendicular to the second extending direction D2 and the optical axis A3 of the lens 120, i.e. along the y-direction. As a result, when the light 111 is projected onto a plane 25 meters away from the optical module 100, an illumination distribution having a cut-off line CL is formed, as shown in FIG. 3. However, in other embodiments, the optical axis A3 may not coincide with the optical axis A4, or the optical axis A3 may not be parallel to the optical axis A4. Moreover, in this embodiment, the first axis of symmetry A1 is substantially parallel to the optical axis A4. However, in other embodiments, the first axis of symmetry A1 may not be parallel to the optical axis A4.

FIG. 3 is a schematic diagram showing the light distribution on the plane 25 meters away from the optical module 100 in FIG. 1. Referring to FIGS. 1, 2A, and 3, the region above the cut-off line CL is a dark region, and the regions R1, R2, and R3 below the cut-off line CL are bright regions. The illuminance of the region R1 is mainly contributed by the light 111 from the first portion 222, the illuminance of the region R2 is mainly contributed by the light 111 from the second portion 224, and the illuminance of the region R3 is mainly contributed by the light 111 from the third portion 226. In this embodiment, the included angle θ shown in FIG. 2A is, for example, 45 degrees, so that the included angle between the segments S1 and S2 of the cut-off line CL and the included angle between the segments S2 and S3 of the cut-off line CL are both 135 degrees, so as to comply with ECE R112 code. However, if the optical module 100 is used in other countries having other traffic regulations, the included angle θ may not be 45 degrees; that is, the width W may not be equal to the step difference H. The light distribution in FIG. 3 is adapted to the left-hand traffic. In other embodiments, for the right-hand traffic, the optical element complying with the mirror image (i.e. the left and the right are reversed) of the optical element 200 in FIG. 2A may be used; that is, the first portion 222, the third portion 226, and the second portion 224 are arranged in sequence along the −x-direction, and the regions R1, R3, and R2 are arranged in sequence along the −x-direction, so as to be adapted to the right-hand traffic.

In this embodiment, the second axis of symmetry A2 is disposed between the first axis of symmetry A1 and the optical axis A3 in the y direction. However, in other embodiments, the optical axis A3 may be disposed between the second axis of symmetry A2 and the first axis of symmetry A1. In still other embodiments, the optical axis A3 and the second axis of symmetry A2 may both be located at the same height along the y-direction.

In the optical element 200 and the optical module 100 in this embodiment, the third portion 226 of the light exiting surface 220 extends from the first portion 222 to the second portion 224 along the first extending direction D1, and the first extending direction D1 is inclined with respect to the second extending direction D2 of the first portion 222, so that the cut-off line CL may be formed 25 meters away from the optical module 100 or the optical element 200 and may comply with related regulations, e.g. ECE R112 code. That is to say, the related regulations may be satisfied by using the optical element 200, i.e. a lens, having the light entering surface 210 and the light exiting surface 220, so that the light use efficiency of the optical element and the light efficiency of the optical module are improved. In addition, since the optical element 200, i.e. a lens, is adopted to make the light shape of the optical module 100 comply with the related regulations, the volume of the optical module may be effectively reduced.

Figure 4A:
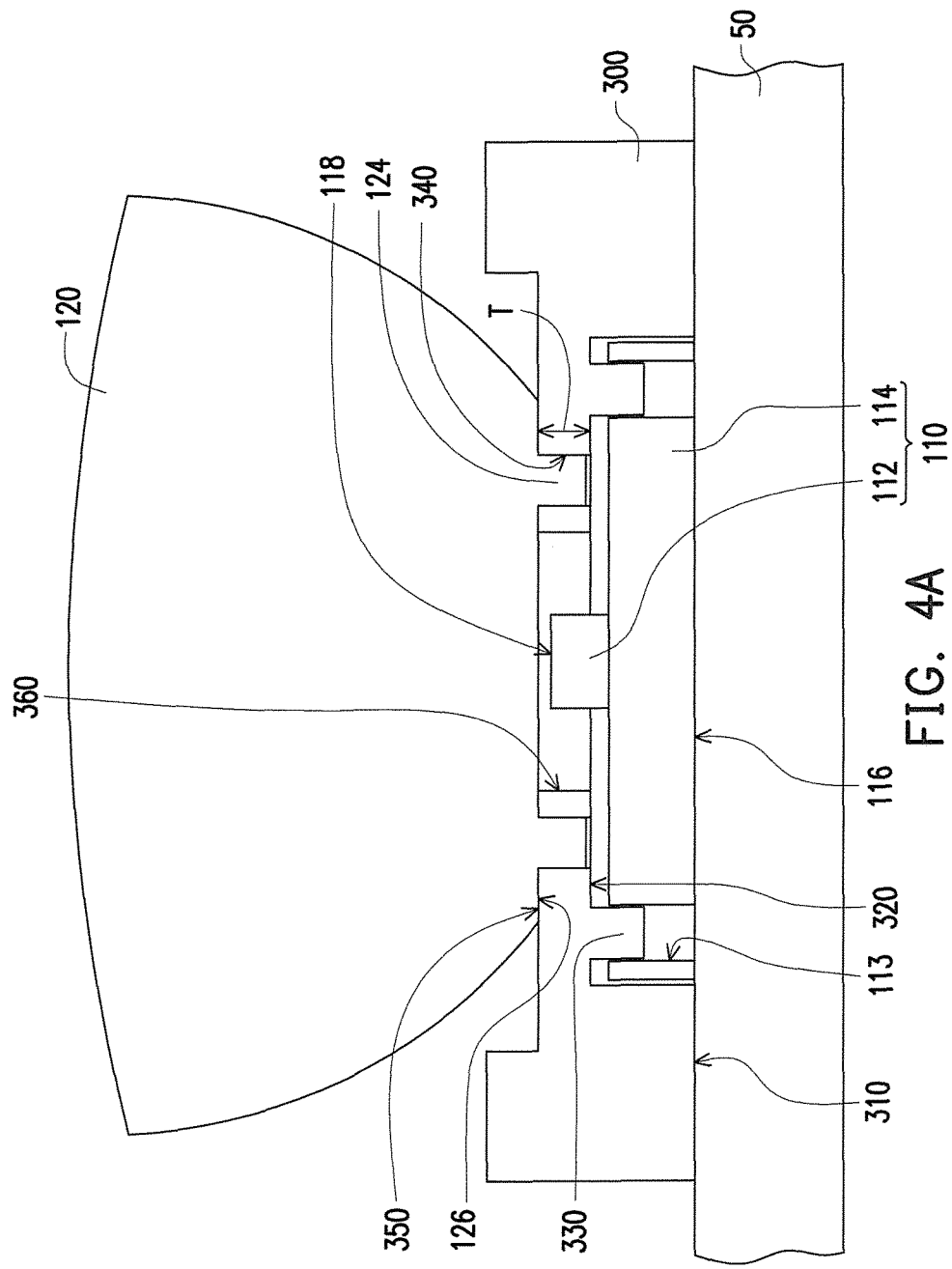
FIG. 4A is a schematic cross-sectional view showing a lens carrier fixing the light source unit and the lens in FIG. 1.
Figure 4B:
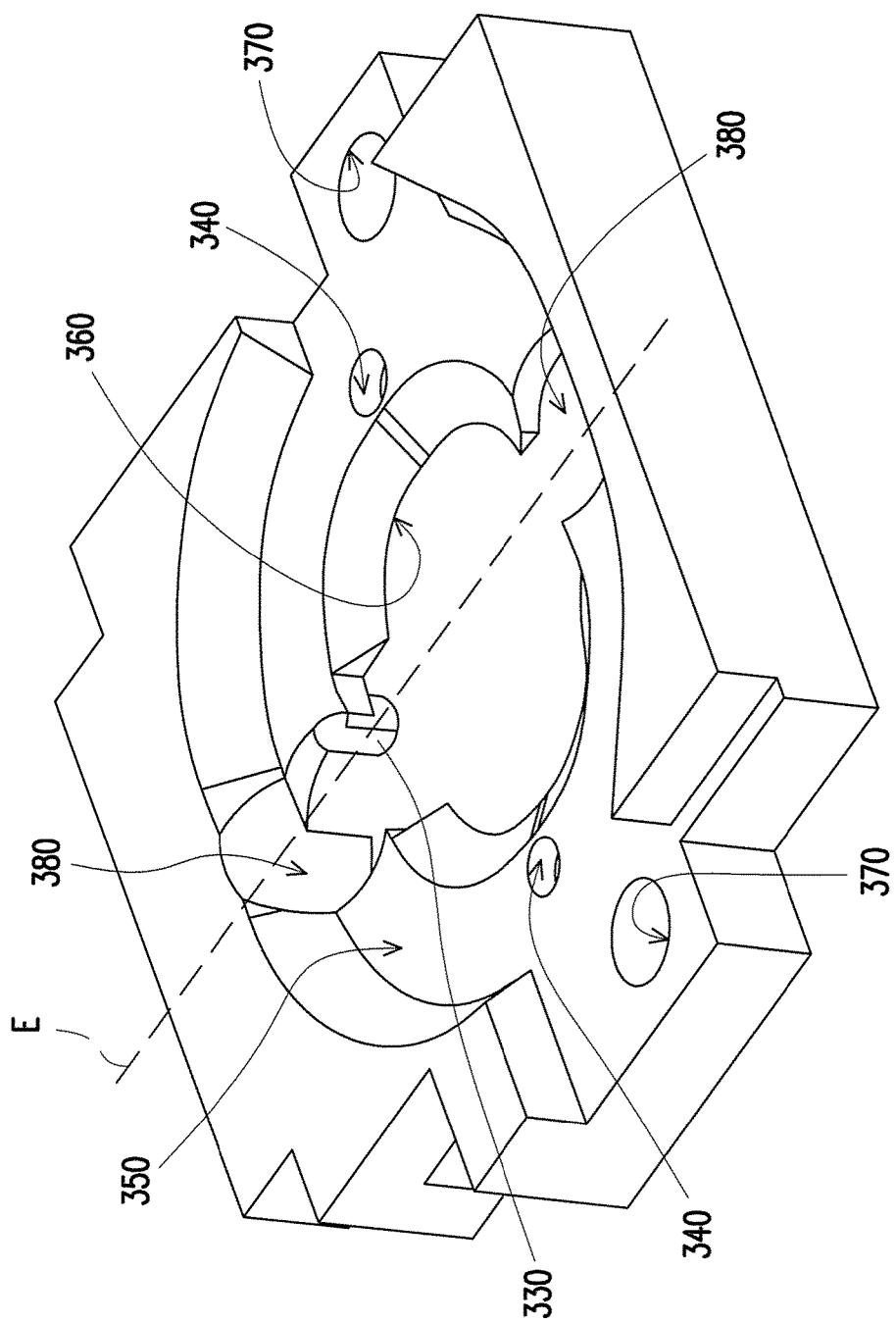
FIGS. 4B and 4C are schematic perspective views of the lens carrier in FIG. 4A.
Figure 4C:
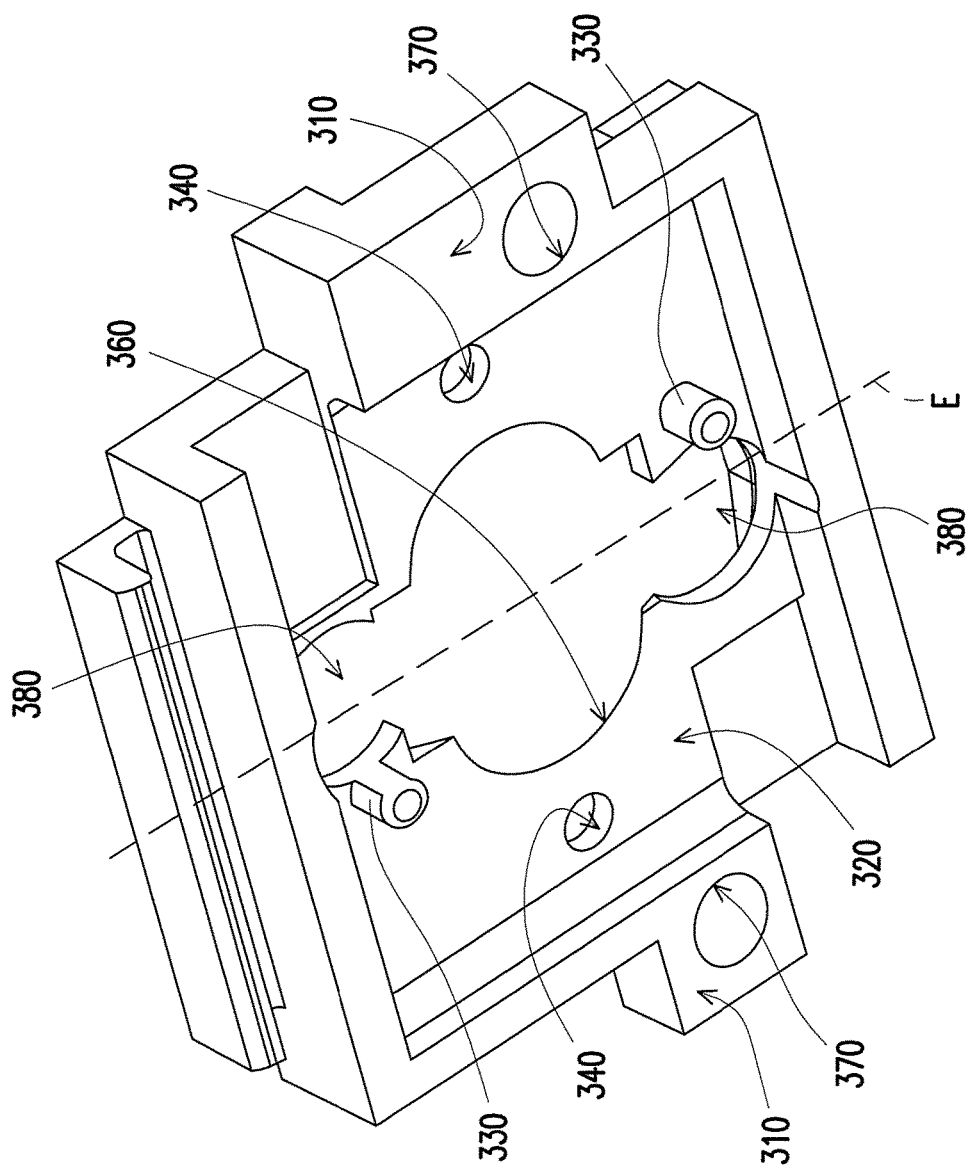

FIG. 4A is a schematic cross-sectional view showing a lens carrier fixing the light source unit and the lens in FIG. 1, and FIGS. 4B and 4C are schematic perspective views of the lens carrier in FIG. 4A. Referring to FIGS. 1 and 4A-4C, in this embodiment, the optical module 100 further includes a lens carrier 300 fixing the light source unit 110 and the lens 120. The lens carrier 300 includes a first bottom base surface 310, a second bottom base surface 320, a plurality of bottom positioning structures 330, a plurality of top positioning structures 340, and a top base surface 350. The first bottom base surface 310 is on a bottom side of the lens carrier 300 and at a first fixed relative position with respect to a bottom surface 116 of the light source unit 110, e.g. the bottom surface of the carrying board 114. In this embodiment, the bottom surface 116 of the light source unit 110 is aligned with the first bottom base surface 310. However, in other embodiments, the bottom surface 116 of the light source unit 110 may not be aligned with the first bottom base surface 310. In this embodiment, the second bottom base surface 320 is on the bottom side and at a second fixed relative position with respect to a light emitting surface 118 of the light source unit 110, e.g. the light emitting surface of the LED 112. In this embodiment, the light emitting surface 118 is higher than the second bottom base surface 320. However, in other embodiments, the light emitting surface 118 may be lower than the second bottom base surface 320 or aligned with the second bottom base surface 320.

The bottom positioning structures 330 are located on the bottom side and respectively engaged with a plurality of positioning structures 113 of the light source unit 110. In this embodiment, the bottom positioning structures 330 are protrusions, the positioning structures 113 are holes or recesses of the carrying board 114, and the protrusions are inserted into the holes or recesses, respectively. However, in other embodiments, the bottom positioning structures 330 may be holes or recesses, the positioning structures 113 may be protrusions, and the positioning structures 113 are inserted into the bottom positioning structures 330, respectively.

The top positioning structures 340 are located on a top side of the lens carrier 300 opposite to the bottom side and respectively engaged with a plurality of positioning structures 124 of the lens 120. In this embodiment, the top positioning structures 340 are holes or recesses, the positioning structures 124 are protrusions, and the positioning structures 124 are inserted into the top positioning structures 340, respectively. However, in other embodiments, the top positioning structures 340 may be protrusions, and the positioning structures 124 may be holes or recesses, and the top positioning structures 340 are inserted into the positioning structures 124.

The top base surface 350 is on the top side and at a third fixed relative position with respect to the lens 120. In this embodiment, the bottom surface 126 of the lens 120 leans against the top base surface 350. For example, the bottom surface 126 is in contact with the top base surface 350. However, in other embodiments, the bottom surface 126 may be separate from the top base surface 350. In this embodiment, the top positioning structures 340 are located at the top base surface 350. In this embodiment, the second bottom base surface 320 is located between the top base surface 350 and the first bottom base surface 310.

In this embodiment, the lens carrier 300 further includes a central opening 360 communicating with the top base surface 350 and the second bottom base surface 320 and configured to expose a part of the light source unit 110. In this embodiment, the central opening 360 exposes the LED 112, so that the light 111 emitted from the LED 112 may pass through the opening 360 and reach the lens 120.

In this embodiment, a perpendicular distance T between the top base surface 350 and the second bottom base surface 320 is less than 3 millimeters, so that the light emitting surface 118 may be closer to the lens 120, and the lens 120 can thus effectively collect more light from the LED with various light emitting angles.

In the lens carrier 300 in this embodiment, the first bottom base surface 310, the second bottom base surface 320, and the bottom positioning structures 330 are configured to position the light source unit 110, and the top base surface 350 and the top positioning structures 340 are configured to position the lens 120, so that the lens 120 may be precisely positioned at a relative position with respect to the light source unit 110, so as to ensure the lens 120 effectively using the light 111 from the light source unit 110 to form a light shape complying with the related regulations and thus increase the light efficiency of the optical module 100.

In this embodiment, the lens carrier 300 may further include a plurality of holes 370, and a plurality of screws may penetrate through the holes 370, respectively, and into a fixing board 50 (shown in FIG. 4A) under the lens carrier 300, so as to screw the lens carrier 300 and the fixing board 50 together. Moreover, in this embodiment, the lens carrier 300 may further include a plurality of openings 380 beside the central opening 360. The openings 380 expose the carrying board 112 of the light source unit 110, so as to facilitate screwing the carrying board 112 to the fixing board 50.

In this embodiment, the lens carrier 300 may have a central axis E, the bottom positioning structures 330 may be located on two opposite sides of the central axis E, respectively, and the top positioning structures 340 may be located on two opposite sides of the central axis E, respectively. Moreover, the holes 370 may be located on two opposite sides of the central axis E. In other embodiments, the openings 380 may be located on two opposite sides of the central axis E.

Figure 5:
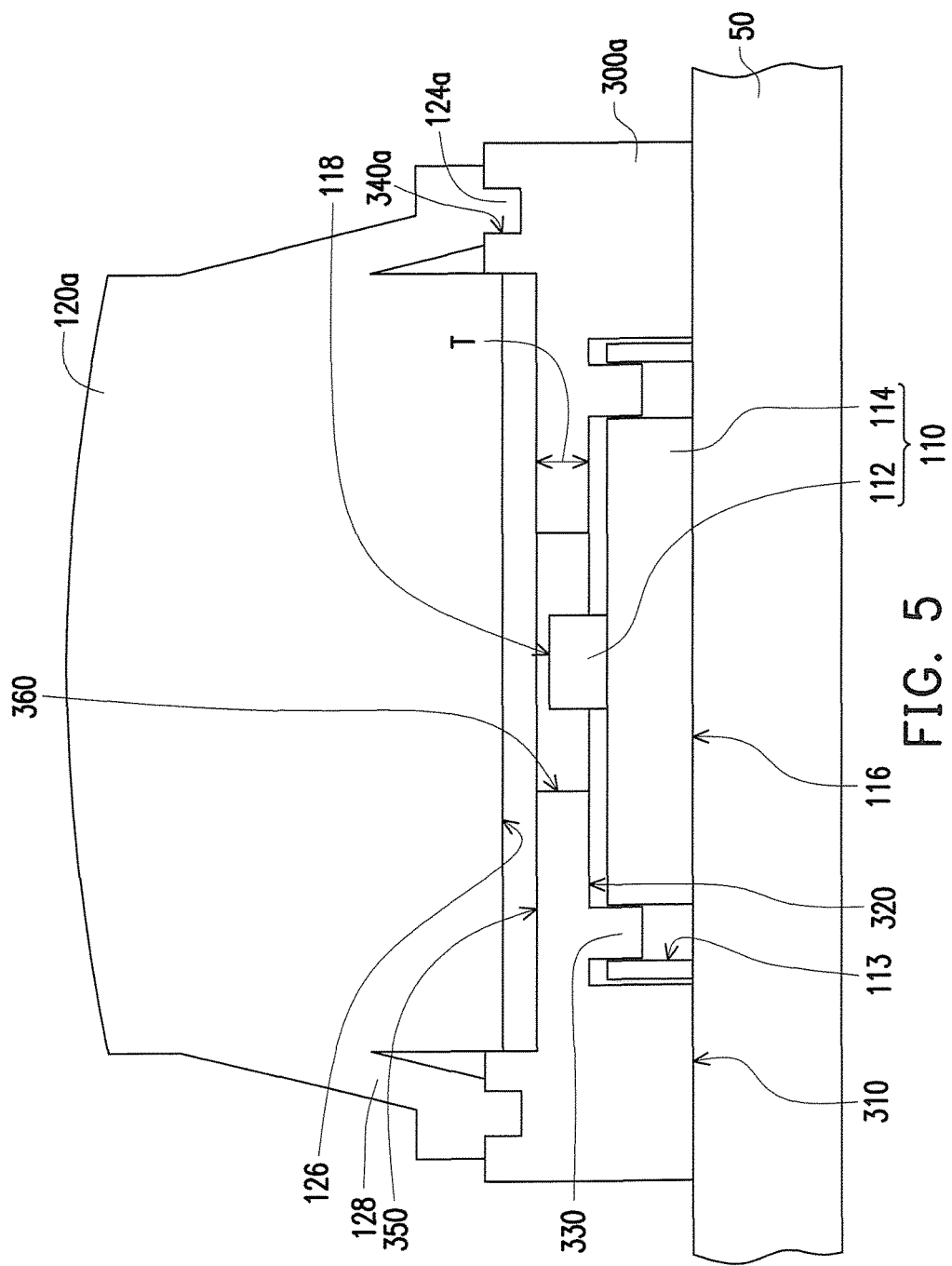
FIG. 5 is a schematic cross-sectional view showing a lens, a lens carrier, and a light source unit according to another embodiment of the invention.

FIG. 5 is a schematic cross-sectional view showing a lens, a lens carrier, and a light source unit according to another embodiment of the invention. Referring to FIG. 5, the lens 120a and the lens carrier 300a in this embodiment are similar to the lens 120 and the lens carrier 300 in FIG. 4A, and the main difference therebetween is as follows. In this embodiment, the top positioning structures 340a are located at the edge of the lens carrier 300a on the top side and around the top base surface 350. Moreover, the positioning structures 124a on legs 128 of the lens 120a are engaged with the top positioning structures 340a. In this embodiment, the top positioning structures 340a are holes or recesses, the positioning structures 124a are protrusions, and the positioning structures 124a are inserted into the top positioning structures 340a, respectively. However, in other embodiments, the top positioning structures 340a may be protrusions, and the positioning structures 124a may be holes or recesses, and the top positioning structures 340a are inserted into the positioning structures 124a. In addition, in this embodiment, the bottom surface 126 of the lens 120a may be separate from the top base surface 350, but the invention is not limited thereto.

In conclusion, in the optical element and the optical module according to the embodiment of the invention, the third portion of the light exiting surface extends from the first portion to the second portion along a first extending direction, and the first extending direction is inclined with respect to the second extending direction of the first portion, so that a cut-off line may be formed 25 meters away from the optical module or the optical element and may comply with related regulations, e.g. ECE R112 code in Regulations of United Nations Economic Commission for Europe (ECE regulations). That is to say, the related regulations may be satisfied by using the optical element having the light entering surface and the light exiting surface, so that the light use efficiency of the optical element and the light efficiency of the optical module are improved. In the lens carrier according to the embodiment of the invention, the first bottom base surface, the second bottom base surface, and the bottom positioning structures are configured to position the light source unit, and the top base surface and the top positioning structures are configured to position the lens, so that the lens may be precisely positioned at a relative position with respect to the light source unit, so as to ensure the lens effectively using the light from the light source unit to form a light shape complying with the related regulations and thus increase light efficiency.

It will be apparent to those skilled in the art that various modifications and variations can be made to the structure of the invention without departing from the scope or spirit of the invention. In view of the foregoing, it is intended that the invention covers modifications and variations of this invention provided they fall within the scope of the following claims and their equivalents.

What is claimed is:

1. An optical element comprising:
a light entering surface; and
a light exiting surface opposite to the light entering surface, the light exiting surface comprising:
a first portion being a curved surface;
a second portion being a curved surface and spaced from the first portion by a step difference; and
a third portion extending from the first portion to the second portion along a first extending direction, wherein the first portion extends along a second extending direction, and the first extending direction is inclined with respect to the second extending direction,
wherein an angle between the first extending direction and the second extending direction is an acute angle,
and a radius of curvature of the first portion is substantially the same as a radius of curvature of the second portion.

2. The optical element according to claim 1, wherein the first portion, the second portion, and the third portion are pillar-shaped surfaces, cylindrical surfaces, or freeform surfaces.

3. The optical element according to claim 1, wherein a cross-section of the optical element perpendicular to the second extending direction and formed by cutting the first portion has a first axis of symmetry, a cross-section of the optical element perpendicular to the second extending direction and formed by cutting the second portion has a second axis of symmetry, and a distance between the first axis of symmetry and the second axis of symmetry and along a direction perpendicular to the second extending direction is substantially the same as the step difference.

4. The optical element according to claim 1, wherein the second portion is spaced from the first portion by a width along the second extending direction, and the width is substantially the same as the step difference.

5. The optical element according to claim 1, wherein the light entering surface is a plane or a curved surface.

6. An optical module comprising:
a light source unit configured to emit light;
a lens disposed on a path of the light; and
an optical element disposed on the path of the light, the lens being disposed between the light source unit and the optical element, the optical element comprising:
a light entering surface; and
a light exiting surface opposite to the light entering surface, the light exiting surface comprising:
a first portion being a curved surface;
a second portion being a curved surface and spaced from the first portion by a step difference; and
a third portion extending from the first portion to the second portion along a first extending direction, wherein the first portion extends along a second extending direction, and the first extending direction is inclined with respect to the second extending direction,
wherein an angle between the first extending direction and the second extending direction is an acute angle,
and a radius of curvature of the first portion is substantially the same as a radius of curvature of the second portion.

7. The optical module according to claim 6, wherein the first portion, the second portion, and the third portion are pillar-shaped surfaces, cylindrical surfaces, or freeform surfaces.

8. The optical module according to claim 6, wherein a cross-section of the optical element perpendicular to the second extending direction and formed by cutting the first portion has a first axis of symmetry, a cross-section of the optical element perpendicular to the second extending direction and formed by cutting the second portion has a second axis of symmetry, and a distance between the first axis of symmetry and the second axis of symmetry and along a direction perpendicular to the second extending direction is substantially the same as the step difference.

9. The optical module according to claim 6, wherein the second portion is spaced from the first portion by a width along the second extending direction, and the width is substantially the same as the step difference.

10. The optical module according to claim 6, wherein the light entering surface is a plane or a curved surface.

11. The optical module according to claim 6, wherein a cross-section of the optical element perpendicular to the second extending direction and formed by cutting the first portion has a first axis of symmetry, a cross-section of the optical element perpendicular to the second extending direction and formed by cutting the second portion has a second axis of symmetry, an optical axis of the lens coincides with an optical axis of the light source unit, and the optical axis of the lens and the first axis of symmetry are not at a same height along a direction perpendicular to the second extending direction and the optical axis of the lens, so that when the light is projected onto a plane 25 meters away from the optical module, an illumination distribution having a cut-off line is formed.

12. The optical module according to claim 6 further comprising a lens carrier fixing a light source unit and a lens, the lens carrier comprising:
 a first bottom base surface on a bottom side of the lens carrier and at a first fixed relative position with respect to a bottom surface of the light source unit;
 a second bottom base surface on the bottom side and at a second fixed relative position with respect to a light emitting surface of the light source unit;
 a plurality of bottom positioning structures located on the bottom side and respectively engaged with a plurality of positioning structures of the light source unit;
 a plurality of top positioning structures located on a top side of the lens carrier opposite to the bottom side and respectively engaged with a plurality of positioning structures of the lens; and
 a top base surface on the top side and at a third fixed relative position with respect to the lens.

13. The optical module according to claim 12, wherein a perpendicular distance between the top base surface and the second bottom base surface is less than 3 millimeters.

* * * * *